United States Patent
Tsai

[19]

[11] Patent Number: 6,120,044
[45] Date of Patent: Sep. 19, 2000

[54] FOLDABLE ROLLERBOARD

[76] Inventor: Suei Der Tsai, P.O. Box 63-99, Taichung, Taiwan

[21] Appl. No.: 08/863,981

[22] Filed: May 27, 1997

[51] Int. Cl.[7] .................................................. A61G 7/10
[52] U.S. Cl. ............................... 280/87.05; 280/87.041; 280/639; 280/641
[58] Field of Search ........................ 280/87.041, 87.05, 280/63, 200, 263, 270, 639, 641

[56] References Cited

U.S. PATENT DOCUMENTS

| | | | |
|---|---|---|---|
| 1,664,858 | 4/1928 | Headly | 280/87.05 |
| 2,289,661 | 7/1942 | Lewis | 280/293 |
| 3,992,029 | 11/1976 | Wahizawa et al. | 280/221 |
| 4,018,449 | 4/1977 | Anderson | 280/33.99 |
| 5,325,938 | 7/1994 | King | 188/19 |

FOREIGN PATENT DOCUMENTS 534332  3/1922  France ................. 280/87.041

*Primary Examiner*—Brian L. Johnson
*Assistant Examiner*—Michael Cuff

[57] ABSTRACT

A rollerboard includes a tube having a front wheel secured to the bottom and having a handle. A bracket is pivotally coupled to the tube and has a lower portion pivotally coupled to a board for allowing the bracket to be folded relative to the board to a compact folded configuration. A beam has a lower portion pivotally coupled to the board and has an upper portion pivotally coupled to a bar at a pivot pin. The bar is pivotally coupled to the bracket. The pivot pin may be forced toward the bracket for securing the tube at the vertical position relative to the board.

6 Claims, 5 Drawing Sheets

FOLDABLE ROLLERBOARD

BACKGROUND OF THE INVENTION

1. Field of the Invention

The present invention relates to a rollerboard, and more particularly to a foldable rollerboard.

2. Description of the Prior Art

Typical rollerboards comprise a board and a handle vertically secured on the front portion of the board. The board includes one or more wheels secured to the bottom for allowing the board to be moved forward by the user. However, the handle is vertically disposed on the front portion of the board such that the rollerboard includes a large volume which is adverse for storing and transportation purposes.

The present invention has arisen to mitigate and/or obviate the afore-described disadvantages of the conventional roller boards.

SUMMARY OF THE INVENTION

The primary objective of the present invention is to provide a rollerboard which may be folded to a compact configuration.

In accordance with one aspect of the invention, there is provided a rollerboard comprising a tube including a lower portion having a front wheel and including an upper portion having a handle, a bracket including an upper portion pivotally coupled to the lower portion of the tube and including a lower portion, a board including a front portion pivotally coupled to the lower portion of the bracket at a pivot shaft for allowing the tube and the bracket to be rotated relative to the board about the pivot shaft between a vertical position and a horizontal position, the board including a rear portion having a rear wheel, and means for securing the bracket to the board and for maintaining the tube at the vertical position relative to the board.

The securing means includes a beam having a lower portion pivotally coupled to the front portion of the board at a pivot axle and having an upper portion, and a bar having an upper portion pivotally coupled to the bracket at a pivot rod and having a lower portion pivotally coupled to the upper portion of the beam at a pivot pin, the pivot axle and the pivot rod defines an axis, the bracket is secured to the board and maintained at the vertical position relative to the board when the pivot pin is moved beyond the axis.

A lever means may move the pivot pin beyond the axis for allowing the beam to be rotated and folded relative to the bar.

The moving means includes a lever pivotally coupled to the bracket, the lever includes a first end having a handgrip and includes a second end for engaging with the lower portion of the bar and for moving the pivot pin beyond the axis.

A retainer is pivotally coupled to the bracket and includes at least one depression for engaging with the pivot pin and for retaining the pivot pin in place.

A rod includes a lower portion slidably engaged in the tube, the rod includes a groove, the tube includes a ring secured to the upper portion, the ring includes a projection extended radially inward for engaging with the groove and for preventing the rod from rotating relative to the tube, the handle is provided on top of the rod. A stop means may prevent the rod from disengaging from the tube.

The rear portion of the board includes a fork for supporting the rear wheel, and a brake arm pivotally secured to the fork, the brake arm including a first end having a brake shoe for engaging with and for braking the rear wheel.

The board includes a bottom portion having a stand for supporting the rollerboard in place.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
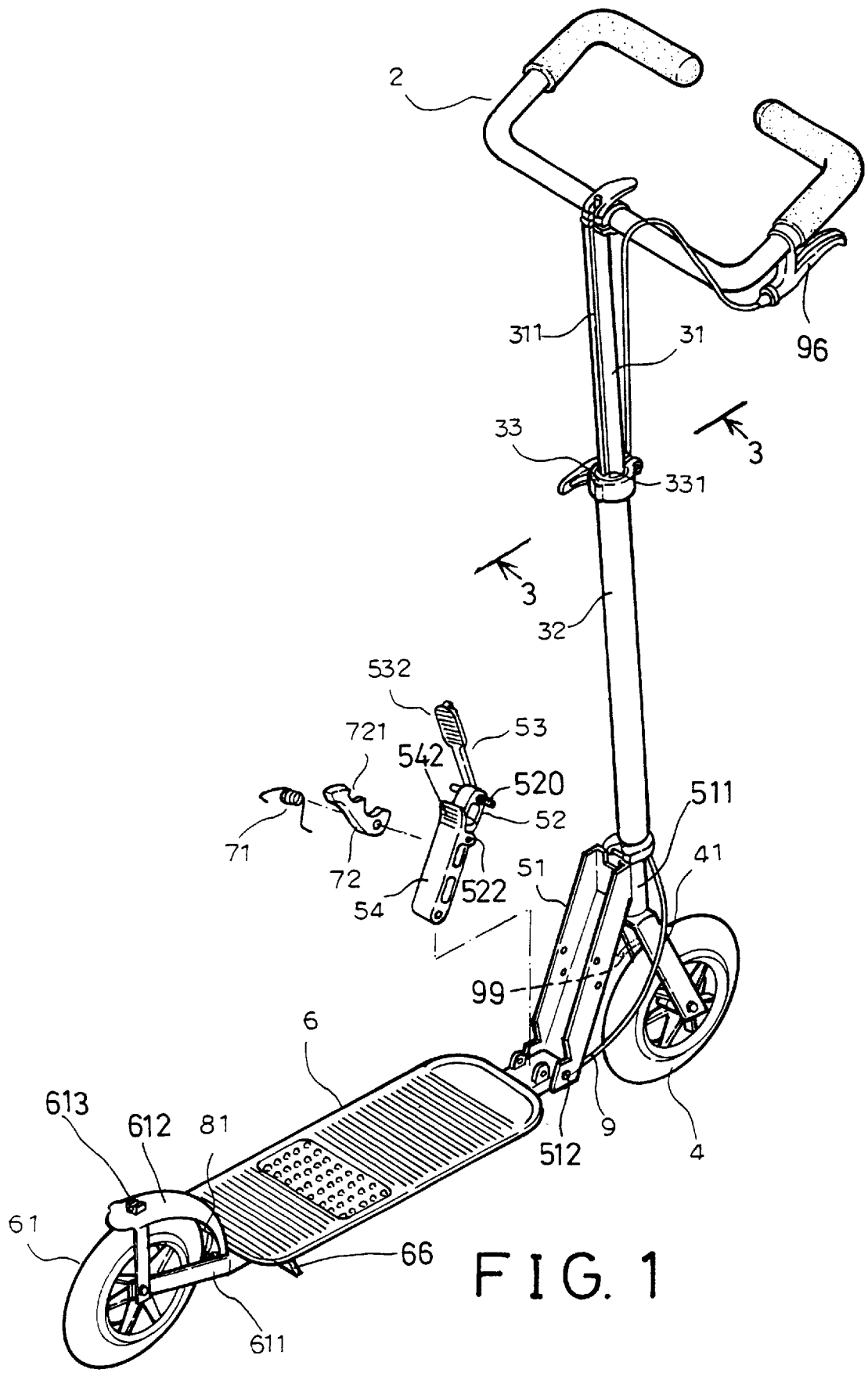
FIG. 1 is a partial exploded view of a rollerboard in accordance with the present invention.
Figure 3:
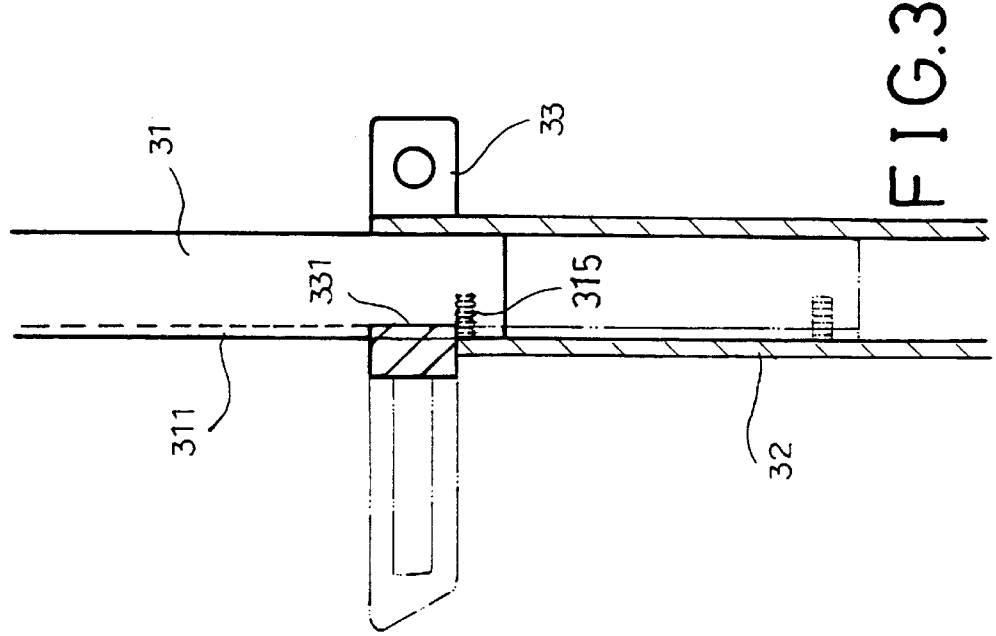
FIG. 3 is a partial cross sectional view taken along lines 3—3 of FIG. 1.
Figure 2:
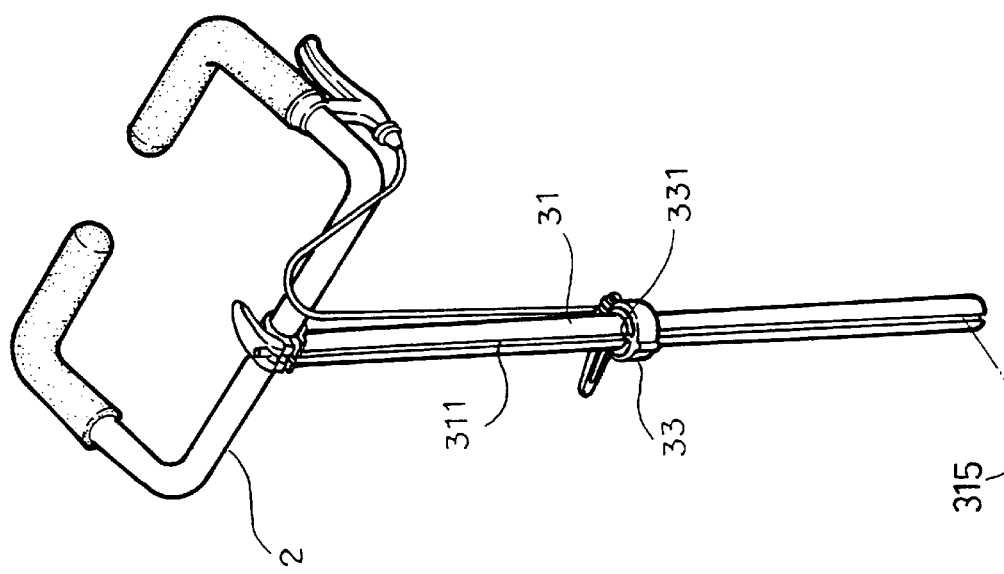
FIG. 2 is a perspective view of a handle.

Referring to the drawings, and initially to FIGS. 1 to 3, a rollerboard in accordance with the present invention comprises a tube 32, and a rod 31 slidably engaged in the tube 32. The rod 31 includes a groove 311 formed along the length and includes a handle 2 secured on top. The tube 32 includes a wheel 4 secured to the bottom at a fork 41 and includes a ring 33 secured on top and having a projection 331 extended radially inward for engaging with the groove 311 and for guiding the rod 31 to move upward and downward relative to the tube 32 and for preventing the rod 31 from rotating relative to the tube 32. The rod 31 includes a stop 315 secured to the bottom for engaging with the projection 331 (FIG. 3) and for preventing the rod 31 from disengaging from the tube 32.

Figure 6:
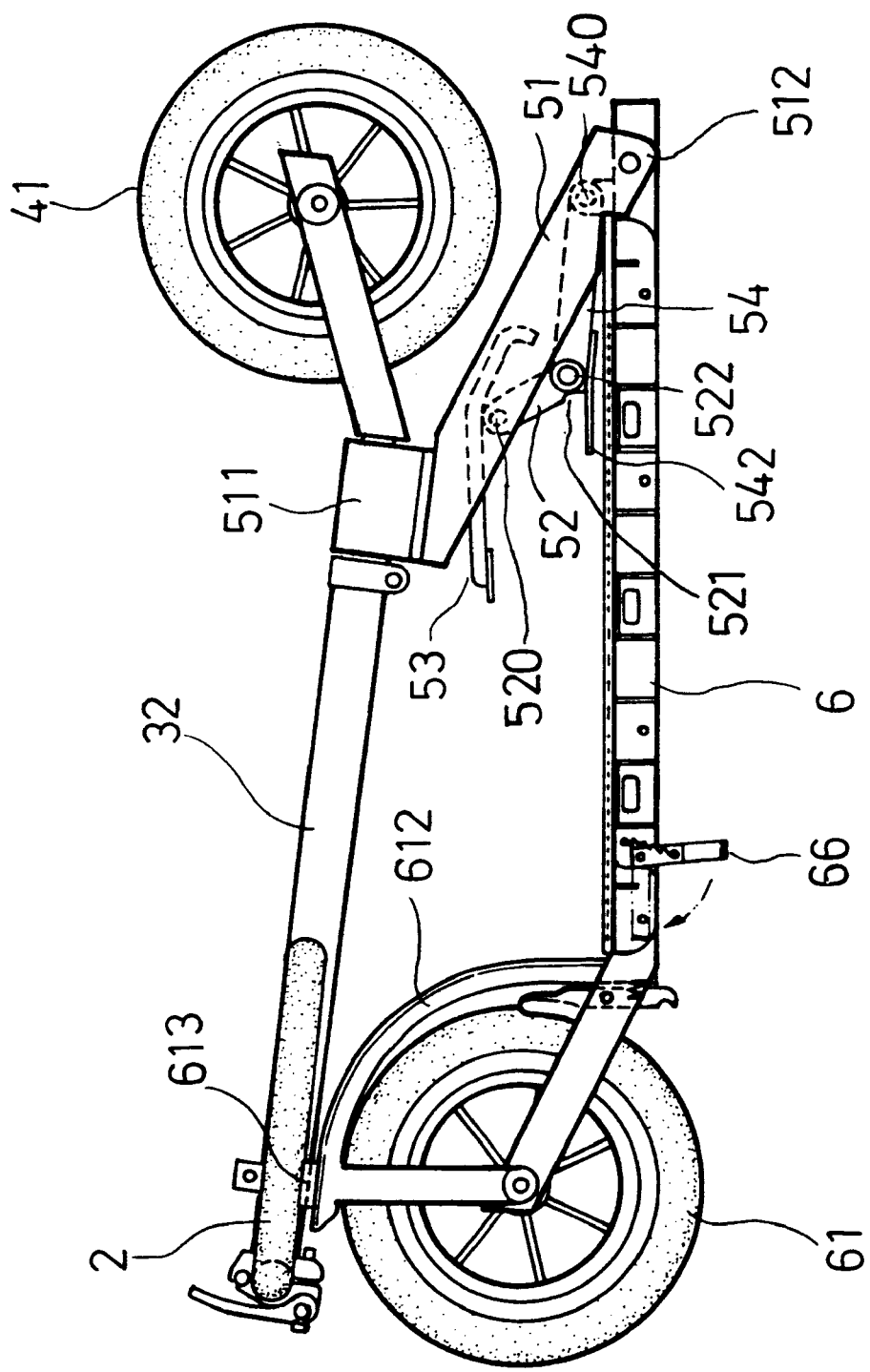
FIG. 6 is a plane view illustrating the folding operation of the rollerboard.

A bracket 51 includes a sleeve 511 rotatably secured to the bottom of the tube 32 for allowing the bracket 51 to be rotated relative to the tube 32, and includes a bottom pivotally coupled to a front portion of a board 6 at a pivot shaft 512 for allowing the tube 32 and the rod 31 to be folded toward the board 6 about the pivot shaft 512 (FIG. 6). The board 6 includes a wheel 61 secured to the rear portion at a fork 611 and includes a shield 612 secured to the rear portion. The shield 612 has a pad 613 provided on top. The board 6 includes a stand 66 provided on the bottom for supporting the rollerboard at a vertically standing position (FIG. 1).

Figure 4:
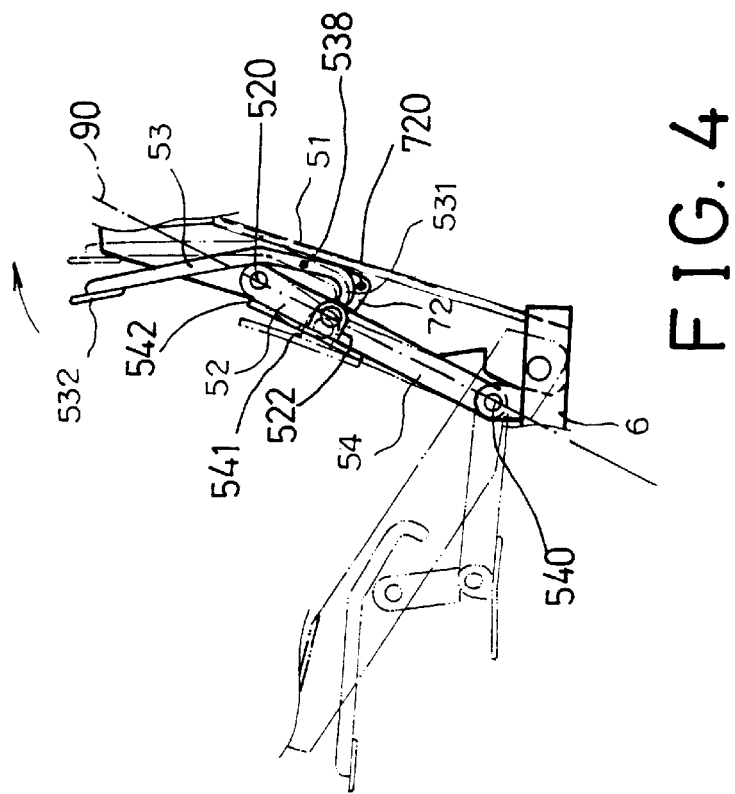
FIGS. 4 and 5 are partial cross sectional views illustrating the folding mechanism of the rollerboard.
Figure 5:
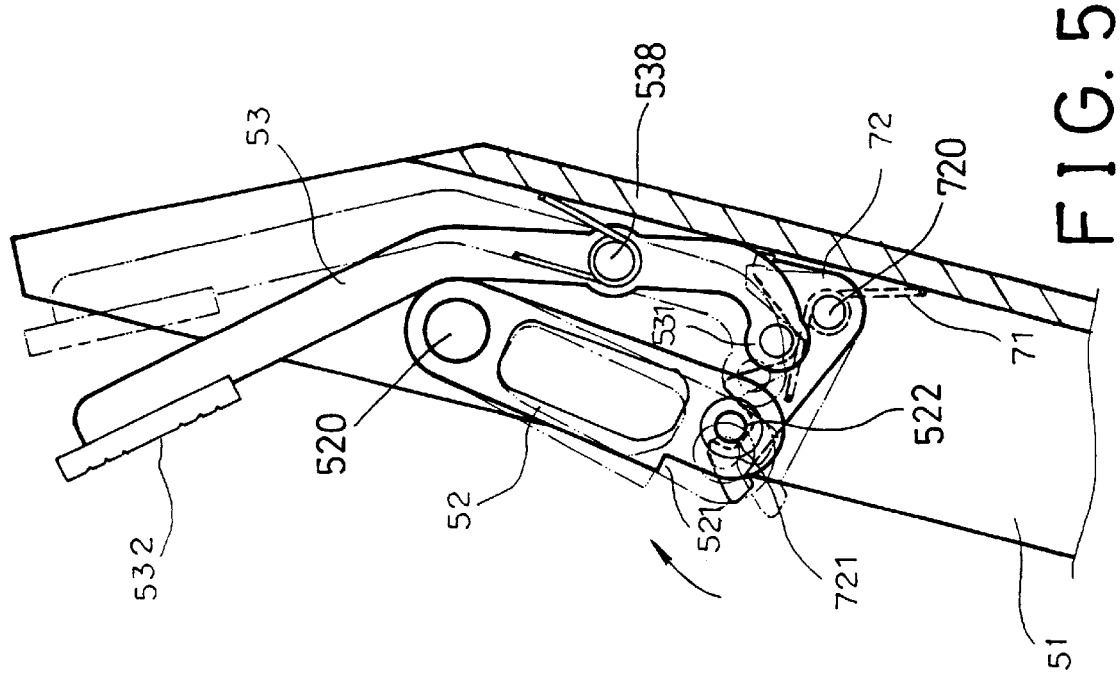

Referring next to FIGS. 4–6, and again to FIG. 1, a beam 54 has a lower portion pivotally coupled to the front portion of the board 6 at a pivot axle 540 (FIGS. 4, 6) and includes a protrusion 541 (FIG. 4) and a knob 542 provided on top. A bar 52 includes an upper portion pivotally secured in the bracket 51 at a pivot rod 520 and includes a lower portion pivotally coupled to the upper portion of the beam 54 at a pivot pin 522 for allowing the bar 52 to be folded relative to the beam 54 about the pivot pin 522. The beam 54 and the bar 52 may be folded relative to each other when the pivot pin 522 is at the position as shown in dotted lines in FIGS. 4 and 5 and as shown in FIG. 6. At this moment, the pivot pin 522 has not been moved beyond the axis 90 formed by the pivot axle 540 and the pivot rod 520. When the pivot pin 52 is depressed inward of the bracket 51 and depressed beyond the axis 90 by the knob 542, the beam 54 and the bar 52 are forced to be maintained at the straight and straightened position for securing the tube 32 at the substantially vertical position relative to the board 6 (FIG. 1).

A lever 53 has a middle portion pivotally coupled to the bracket 51 at a pivot pole 538 and includes a handgrip 532 provided on top and includes a lower end 531 for engaging with the lower end of the bar 52 and for moving the pivot pin 522 outward beyond the axis 90 when the lever 53 is rotated by the handgrip 532, such that the tube 32 may be folded relative to the board 6 again. A retainer 72 is pivotally coupled to the bracket 51 at a pivot stick 720 (FIGS. 4, 5) and includes a depression 721 for engaging with the pivot pin 522 and for retaining the pivot pin 522 in position (FIG. 5). A spring 71 may bias the retainer 72 to engage with the pivot pin 522.

Figure 8:
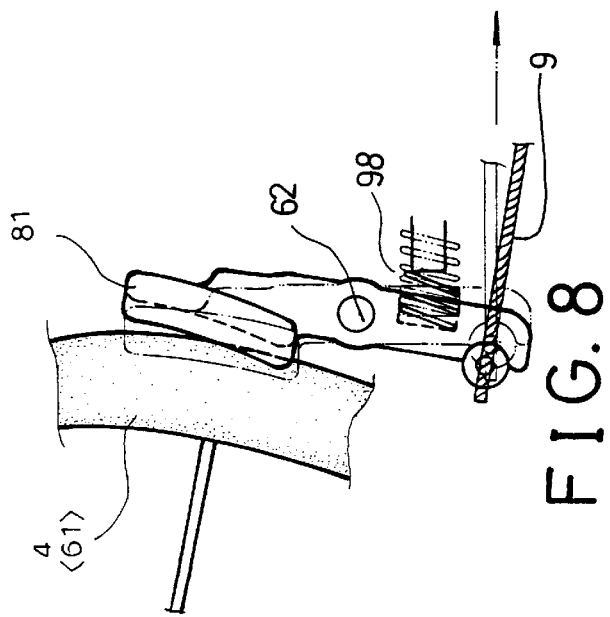
FIG. 8 is a side view illustrating the operation of the brake device.
Figure 7:
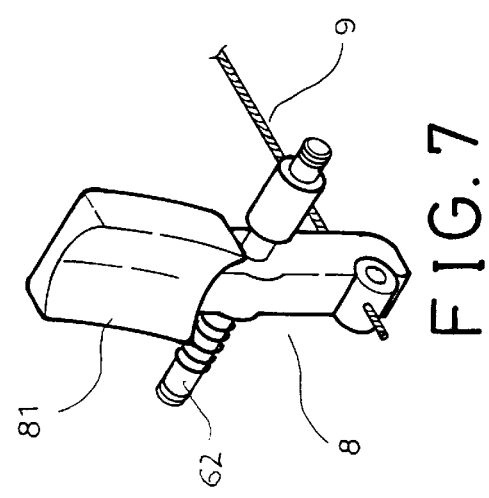
FIG. 7 is a perspective view of a brake device.
Figure 9:
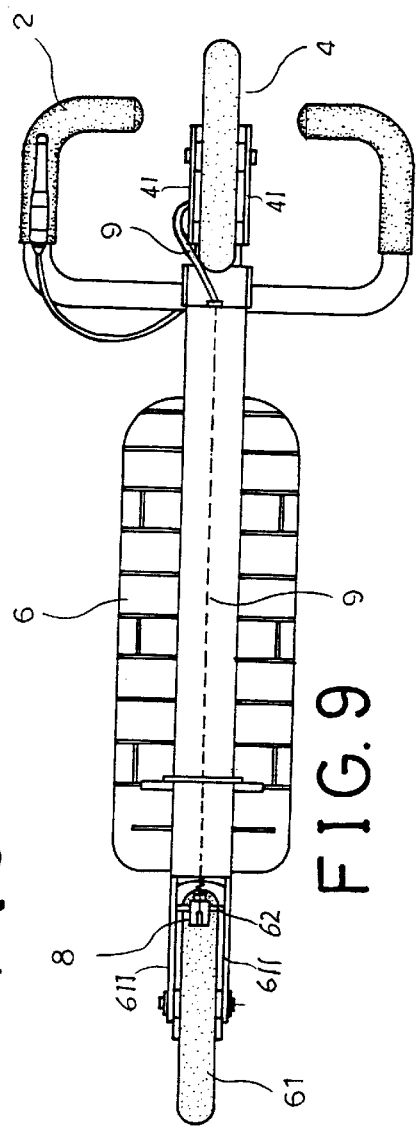
FIG. 9 is a bottom view of the rollerboard.

Referring next to FIGS. 7–9, a brake arm 8 is pivotally coupled to the fork 611 at a spindle 62 and includes a brake shoe 81 provided on top for engaging with and for braking the wheel 61 and includes a bottom portion secured to a brake cable 9 which is coupled to a brake handle 96 (FIG. 1) for allowing the brake handle 96 to actuate the brake shoe 81 to brake the wheel 61. A spring 98 (FIG. 8) may bias the brake shoe 81 to be disengaged from the wheel 61. Another brake device 99 (FIG. 1) may be secured to the fork 41 for braking the front wheel 4.

Accordingly, the rollerboard in accordance with the present invention includes a foldable structure for allowing the rollerboard to be folded to a compact configuration which is excellent for transportation and storing purposes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A rollerboard comprising:

a tube including a lower portion having a front wheel and including an upper portion, a bracket including an upper portion pivotally coupled to said lower portion of said tube and including a lower portion, a board including a front portion pivotally coupled to said lower portion of said bracket at a pivot shaft for allowing said tube and said bracket to be rotated relative to said board about said pivot shaft between a vertical position and a horizontal position, said board including a rear portion having a rear wheel, means for securing said bracket to said board and for maintaining said tube at the vertical position relative to said board, said securing means including a beam having a lower portion pivotally coupled to said front portion of said board at a pivot axle and having an upper portion, and a bar having an upper portion pivotally coupled to said bracket at a pivot rod and having a lower portion pivotally coupled to said upper portion of said beam at a pivot pin, said pivot axle and said pivot rod defining an axis, said bracket being secured to said board and maintained at the vertical position relative to said board when said pivot pin is moved beyond said axis, and means for moving said pivot pin beyond said axis and for allowing said beam to be rotated and folded relative to said bar, said moving means including a lever pivotally coupled to said bracket, said lever including a first end having a handgrip and including a second end for engaging with said lower portion of said bar and for moving said pivot pin beyond said axis.

2. A rollerboard according to claim 1 further comprising a rod including a lower portion slidably engaged in said tube, said rod including a groove, said tube including a ring secured to said upper portion, said ring including a projection extended radially inward for engaging with said groove and for preventing said rod from rotating relative to said tube, said rollerboard including a handle provided on top of said rod.

3. A rollerboard according to claim 2 further comprising means for preventing said rod from disengaging from said tube.

4. A rollerboard according to claim 1, wherein said rear portion of said board includes a fork for supporting said rear wheel, and a brake arm pivotally secured to said fork, said brake arm including a first end having a brake shoe for engaging with and for braking said rear wheel.

5. A rollerboard according to claim 1, wherein said board includes a bottom portion having a stand for supporting said rollerboard in place.

6. A rollerboard comprising:

a tube including a lower portion having a front wheel and including an upper portion, a bracket including an upper portion pivotally coupled to said lower portion of said tube and including a lower portion, a board including a front portion pivotally coupled to said lower portion of said bracket at a pivot shaft for allowing said tube and said bracket to be rotated relative to said board about said pivot shaft between a vertical position and a horizontal position, said board including a rear portion having a rear wheel, means for securing said bracket to said board and for maintaining said tube at the vertical position relative to said board, said securing means including a beam having a lower portion pivotally coupled to said front portion of said board at a pivot axle and having an upper portion, and a bar having an upper portion pivotally coupled to said bracket at a pivot rod and having a lower portion pivotally coupled to said upper portion of said beam at a pivot pin, said pivot axle and said pivot rod defining an axis, said bracket being secured to said board and maintained at the vertical position relative to said board when said pivot pin is moved beyond said axis, and a retainer pivotally coupled to said bracket, said retainer including at least one depression for engaging with said pivot pin and for retaining said pivot pin in place.

* * * * *